US012689234B2

(12) United States Patent
Utsunomiya et al.

(10) Patent No.: US 12,689,234 B2
(45) Date of Patent: Jul. 21, 2026

(54) SIGNAL PROCESSING DEVICE AND SEARCH METHOD

(71) Applicant: ABLIC Inc., Tokyo (JP)

(72) Inventors: Fumiyasu Utsunomiya, Tokyo (JP); Takakuni Douseki, Kusatsu (JP); Hisashi Nishikawa, Kusatsu (JP); Fumiya Nishimura, Kusatsu (JP); Yuichiro Hirai, Kusatsu (JP); Ami Tanaka, Kusatsu (JP)

(73) Assignee: ABLIC Inc., Tokyo (JP)

( * ) Notice: Subject to any disclaimer, the term of this patent is extended or adjusted under 35 U.S.C. 154(b) by 186 days.

(21) Appl. No.: 17/975,350

(22) Filed: Oct. 27, 2022

(65) Prior Publication Data

US 2023/0139575 A1     May 4, 2023

(30) Foreign Application Priority Data

Oct. 28, 2021     (JP) ................................. 2021-176159

(51) Int. Cl.
| | |
|---|---|
| *H02J 50/12* | (2016.01) |
| *G01S 13/34* | (2006.01) |
| *H02J 50/23* | (2016.01) |
| *H02J 50/80* | (2016.01) |

(52) U.S. Cl.
CPC .............. *H02J 50/12* (2016.02); *G01S 13/34* (2013.01); *H02J 50/23* (2016.02); *H02J 50/80* (2016.02)

(58) Field of Classification Search
CPC ........ H02J 50/001; H02J 50/40; H02J 50/402; H02J 50/80
See application file for complete search history.

(56) References Cited

U.S. PATENT DOCUMENTS

| | | | |
|---|---|---|---|
| 9,232,475 B2 * | 1/2016 | Heinzelman | ...... H04W 52/0229 |
| 10,027,378 B2 | 7/2018 | Umeda et al. | |
| 10,333,352 B2 | 6/2019 | Von, III et al. | |

(Continued)

FOREIGN PATENT DOCUMENTS

| | | |
|---|---|---|
| JP | 2016-192636 A | 11/2016 |
| JP | 2017-093223 A | 5/2017 |

(Continued)

OTHER PUBLICATIONS

Japanese-language Office Action issued in Japanese Application No. 2021-176159 dated Jul. 15, 2025, with English translation (10 pages).

*Primary Examiner* — Rexford N Barnie
*Assistant Examiner* — Joseph N Inge
(74) *Attorney, Agent, or Firm* — Crowell & Moring LLP

(57) ABSTRACT

Provided is a sensor device being a signal processing device, including: a capacitor; a sensor unit configured to wirelessly transmit, in a case in which electric power of a predetermined amount or more is accumulated in the capacitor, a first signal (SG1) through use of the electric power accumulated in the capacitor; a reception unit configured to receive a radio wave transmitted from a power transmission device being an external device; and a transmission antenna functioning as a second transmission unit, the transmission antenna being configured to wirelessly transmit, in response to reception of the radio wave, a response signal (SG3) being a second signal generated based on the received radio wave without using the electric power accumulated in the capacitor.

7 Claims, 7 Drawing Sheets

(56)                References Cited

U.S. PATENT DOCUMENTS

| | | | | |
|---|---|---|---|---|
| 11,245,290 | B2 * | 2/2022 | Kim | H02J 50/001 |
| 2008/0030325 | A1 * | 2/2008 | Fries | G06K 19/0701 |
| | | | | 340/539.32 |
| 2010/0090655 | A1 * | 4/2010 | Keating | H02J 50/20 |
| | | | | 320/137 |
| 2014/0375261 | A1 * | 12/2014 | Manova-Elssibony | |
| | | | | H02J 7/00034 |
| | | | | 320/108 |
| 2015/0128733 | A1 * | 5/2015 | Taylor | G01D 11/00 |
| | | | | 73/865.8 |
| 2017/0108585 | A1 * | 4/2017 | Huang | H02J 50/20 |
| 2017/0180919 | A1 * | 6/2017 | Rittner | H04W 4/029 |
| 2018/0069486 | A1 * | 3/2018 | Ouda | H02J 50/80 |
| 2018/0287418 | A1 * | 10/2018 | Zeine | H02J 50/80 |
| 2020/0195256 | A1 * | 6/2020 | Emira | H04B 1/403 |
| 2020/0266673 | A1 * | 8/2020 | Reynolds | H02J 50/20 |
| 2020/0287598 | A1 * | 9/2020 | Zhou | H04B 5/79 |
| 2020/0350781 | A1 * | 11/2020 | La Rosa | H02J 50/20 |
| 2021/0104917 | A1 * | 4/2021 | Kim | H04W 52/0229 |
| 2021/0356417 | A1 * | 11/2021 | Babakhani | H04Q 9/00 |

FOREIGN PATENT DOCUMENTS

| | | | | |
|---|---|---|---|---|
| JP | 2019-161746 | A | 9/2019 | |
| JP | 2019-166040 | A | 10/2019 | |
| JP | 2019-528663 | A | 10/2019 | |
| WO | WO-2018066687 | A1 * | 4/2018 | G08C 17/02 |

* cited by examiner

ADC: Analog Digital Converter

SIGNAL PROCESSING DEVICE AND SEARCH METHOD

RELATED APPLICATIONS

This application claims priority to Japanese Patent Application No. 2021-176159, filed on Oct. 28, 2021, the entire content of which is incorporated herein by reference.

BACKGROUND OF THE INVENTION

1. Field of the Invention

The present invention relates to a signal processing device and a search method.

2. Description of the Related Art

As an example of a signal processing device, in Japanese Patent Application Laid-open No. 2019-166040 (hereinafter referred to as Patent Literature 1), an absorption member is disclosed. The absorption member as disclosed in Patent Literature 1 includes an absorption body, a pair of electrodes, and a detection device. The pair of electrodes generates a current by coming into contact with liquid absorbed by the absorption body. The detection device supplies a signal corresponding to a magnitude of a parasitic resistance which changes in accordance with a size of a non-contact range with respect to the liquid in the pair of electrodes. The absorption member of Patent Literature 1 detects the size of the non-contact range with respect to the liquid in the electrodes. The size of the non-contact range with respect to the liquid in the electrodes can have correspondence with surplus liquid expansion ability in the absorbing body. Accordingly, the absorption member of Patent Literature 1 has an advantage in grasping the surplus absorbing ability of the absorption body.

The absorption member of Patent Literature 1 may be, as an example, a diaper. In this case, the absorption member of Patent Literature 1 can be used for grasping the timing to change the diaper.

From the absorption member of Patent Literature 1, a signal is supplied in accordance with the size of the non-contact range with respect to the liquid in the pair of electrodes. Accordingly, in some cases, the signal is not supplied until the non-contact range reaches a predetermined range. For example, in a case in which the absorption member of Patent Literature 1 is a diaper and is used for grasping the change timing, in some cases, it is desired to grasp the presence or absence of a corresponding diaper before the timing at which the signal indicating the change timing is supplied. Accordingly, there is a demand for a signal processing device (first signal processing device) showing a fast response.

SUMMARY OF THE INVENTION

According to at least one embodiment of the present invention, there is provided a first signal processing device including: a capacitor; a first transmission unit configured to wirelessly transmit, in a case in which electric power of a predetermined amount or more is accumulated in the capacitor, a first signal through use of the electric power accumulated in the capacitor; a reception unit configured to receive a radio wave transmitted from an external device; and a second transmission unit configured to wirelessly transmit, in response to reception of the radio wave, a second signal generated based on the received radio wave without using the electric power accumulated in the capacitor.

In a case in which wireless power transmission is performed with respect to a target device (first signal processing device) through use of a second signal processing device, it is conceivable to use a directional antenna as an antenna in order to perform efficient power transmission by concentrating transmitted electric power in a specific direction. However, in the case in which the directional antenna is used, if the power transmission target device (first signal processing device) is present while being shifted from the direction in which the directional antenna is directed, electric power that can be received by the power transmission target device is decreased. For example, in a case in which the position at which the power transmission target device is present cannot be easily identified for reasons such as the power transmission target device is buried inside of a wall, in some cases, it is difficult to accurately direct the direction of the directional antenna to the position at which the power transmission target device is present. In the case in which the power transmission target device is present while being shifted from the direction in which the directional antenna is directed, the power transmission efficiency is rather decreased. Accordingly, in order to efficiently perform the power transmission, there is a demand for a technology of searching for the direction in which the power transmission target device is present.

According to at least one embodiment of the present invention, there is provided a second signal processing device configured to supply a search signal so as to search for a direction in which a search target device is present, the second signal processing device including: a directional antenna which has a variable direction, and is configured to wirelessly transmit electric power to the search target device; a transmission circuit configured to wirelessly transmit the search signal for searching for the search target device; and a detection circuit configured to receive a response signal transmitted from the search target device which has received the search signal, and to supply a detection signal corresponding to electric power of the response signal wherein the search signal is transmitted in a direction in which the directional antenna having the variable direction is directed.

According to at least one embodiment of the present invention, there is provided a search method of searching for a direction in which a search target device is present, the search method including: transmitting, while changing a direction of a directional antenna configured to wirelessly transmit electric power to the search target device, a search signal in the direction in which the directional antenna is directed; and searching for the direction of the search target device based on a response signal transmitted from the search target device which has received the search signal.

Even in a case in which an operation check (test) is desired to be performed with respect to the first signal processing device as described above, a signal for performing the operation is not always supplied at the timing at which the test is desired to be performed. Accordingly, in some cases, the test cannot be performed at the desired timing. In particular, in a case in which the signal for performing the operation is rarely supplied, it is highly possible that the test cannot be performed at the desired timing. Accordingly, there is a demand for a signal processing device (first signal processing device) capable of performing the test at the desired timing.

According to at least one embodiment of the present invention, there is provided a first signal processing device including: a signal processing circuit configured to receive an input signal; a first generation circuit configured to generate the input signal; and a second generation circuit configured to generate a pseudo signal of the input signal so as to supply the pseudo signal to the signal processing circuit wherein the second generation circuit includes a power reception circuit configured to receive wireless power supply from an outside, and is configured to generate the pseudo signal through use of electric power received by the power reception circuit.

Further details are described as embodiments later.

DETAILED DESCRIPTION OF THE PREFERRED EMBODIMENTS

Figure 1:
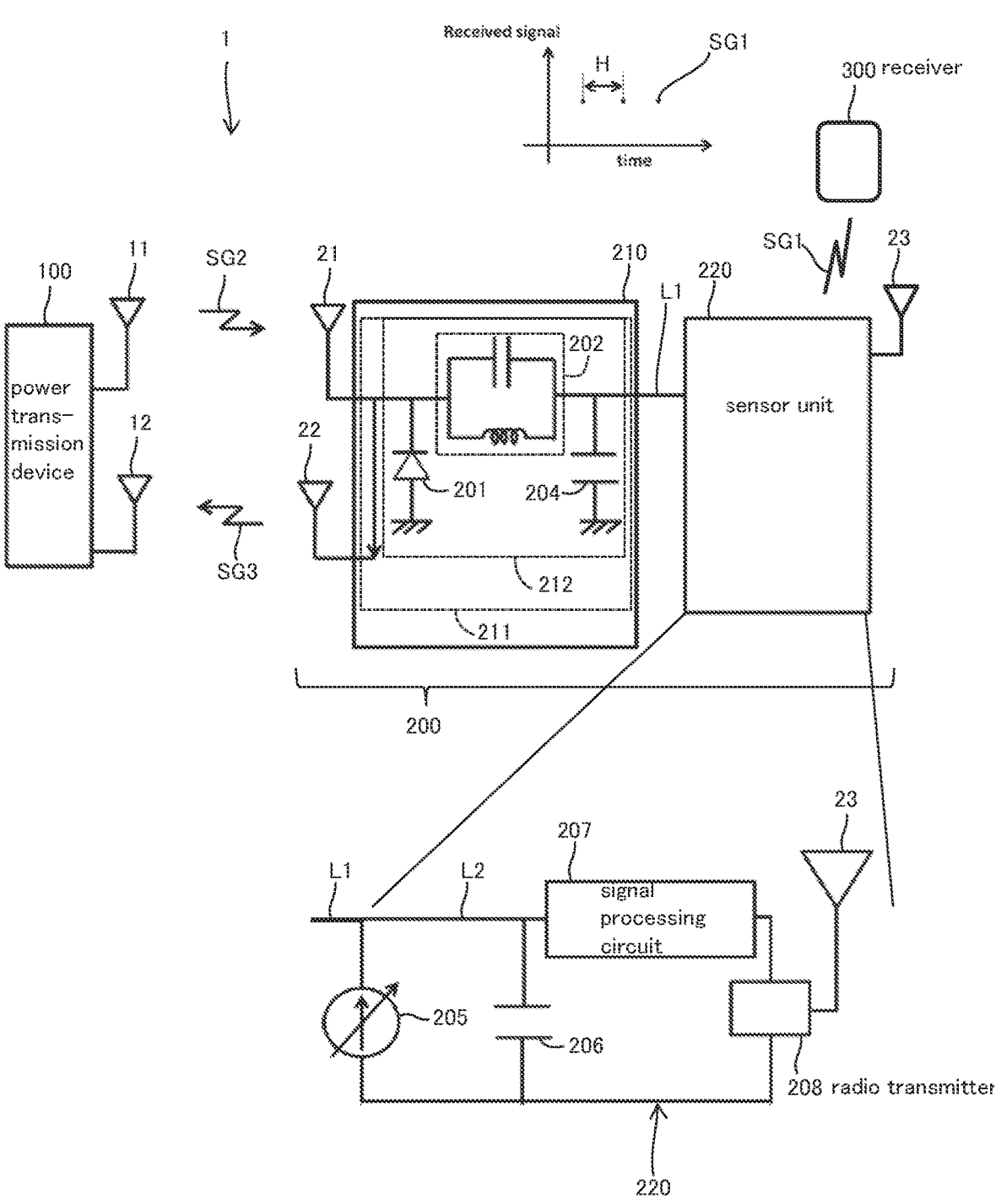
FIG. 1 is a schematic diagram for illustrating an outline of a sensor system and a configuration of a sensor device.

1. Outline of Signal Processing Device and Search Method (1) A signal processing device (first signal processing device) according to at least one embodiment of the present invention includes: a capacitor; a first transmission unit configured to wirelessly transmit, in a case in which electric power of a predetermined amount or more is accumulated in the capacitor, a first signal through use of the electric power accumulated in the capacitor; a reception unit configured to receive a radio wave transmitted from an external device; and a second transmission unit configured to wirelessly transmit, in response to reception of the radio wave, a second signal generated based on the received radio wave without using the electric power accumulated in the capacitor.

The second transmission unit wirelessly transmits the second signal generated based on the received radio wave without using the electric power accumulated in the capacitor. In this manner, even in a case in which electric power of a predetermined amount or more is not accumulated in the capacitor, the second signal is wirelessly transmitted. Accordingly, through reception of the radio wave, the second signal is wirelessly transmitted earlier than the first signal. In this manner, in a case in which the second signal is used as a response signal, a response speed of the signal processing device can be increased.

The second transmission unit wirelessly transmits the second signal generated based on the received radio wave without using the electric power accumulated in the capacitor. Thus, the second signal is wirelessly transmitted from the signal processing device without using the operation in the signal processing device. Accordingly, the second signal is transmitted even in a case in which the signal processing device has an abnormality. In this manner, in a case in which the second signal is not wirelessly transmitted from the signal processing device even after receiving the radio wave, it can be determined that the signal processing device has an abnormality.

(2) Preferably, the second signal is a harmonic wave of the radio wave, the harmonic wave being generated in the reception unit which has received the radio wave. In this manner, the second signal can be emitted through reception of the radio wave by the reception unit.

(3) Preferably, the reception unit includes a rectification circuit configured to rectify the radio wave so as to obtain electric power, and the second signal includes a harmonic wave generated during rectification performed by the rectification circuit. In this manner, the second signal can be emitted through reception of the radio wave by the reception unit and rectification by the rectification circuit.

(4) Preferably, the signal processing device further includes a power generation circuit, and electric power generated by the power generation circuit is accumulated in the capacitor. In this manner, the first signal is supplied through use of the electric power generated by the power generation circuit. The power generation circuit is used as, for example, a power generation sensor so that the signal processing device can be used as a sensor device.

(5) Preferably, the reception unit includes a rectification circuit configured to rectify the radio wave so as to obtain electric power, and the electric power obtained by the rectification circuit is accumulated in the capacitor. In this manner, electric power is acquired through reception of the radio wave from an external device, and the electric power can be used for output of the first signal.

(6) Preferably, the signal processing device further includes a power generation circuit, the rectification circuit is connected to the capacitor via the power generation circuit, and the electric power obtained by the rectification circuit is supplied to the capacitor through a path in which electric power generated by the power generation circuit is to be transmitted. In this manner, the first signal is supplied through output of the second signal from the rectification circuit and accumulation of the electric power obtained by the rectification circuit in the capacitor. In a case in which the first signal is not supplied even after an elapse of time long enough to accumulate electric power of a predetermined amount or more in the capacitor after the second signal is supplied, there is a possibility that the signal processing device has an abnormality. Thus, with this configuration, the abnormality of the signal processing device can be detected through use of the first signal.

(7) Preferably, the power generation circuit includes an electrode configured to generate electric power owing to presence of a detection target, and the rectification circuit is connected to the electrode so that the electric power obtained by the rectification circuit is allowed to be supplied to the capacitor via the electrode. In this manner, the abnormality of the electrode can further be detected.

(8) Preferably, the first transmission unit includes a signal processing circuit, and the signal processing circuit is a battery-less circuit configured to operate through use of the electric power generated by the power generation circuit as power supply electric power. In this manner, the structure of the processing device can be simplified, and a failure caused by a battery can be prevented.

(9) A signal processing device (second signal processing device) according to at least one embodiment of the present invention is a signal processing device configured to supply a search signal so as to search for a direction in which a search target device (first signal processing device) is present, the signal processing device including: a directional antenna which has a variable direction, and is configured to wirelessly transmit electric power to the search target device; a transmission circuit configured to wirelessly transmit the search signal for searching for the search target device; and a detection circuit configured to receive a response signal transmitted from the search target device which has received the search signal, and to supply a detection signal corresponding to electric power of the response signal, and the search signal is transmitted in a direction in which the directional antenna having the variable direction is directed.

The electric power of the response signal can be known based on the detection signal supplied from the detection circuit. The search signal is transmitted in the direction in which the directional antenna having the variable direction is directed. Thus, the direction in which the search target device is present can be searched for in accordance with the electric power of the response signal, and electric power can be wirelessly transmitted in the direction found in the search. Accordingly, efficient power transmission is allowed.

(10) A search method according to at least one embodiment of the present invention is a method of searching for a direction in which a search target device (first signal processing device) is present, the search target device includes a power reception circuit, and the search method includes: transmitting, while changing a direction of a directional antenna configured to wirelessly transmit electric power to the search target device, a search signal in the direction in which the directional antenna is directed; and searching for the direction of the search target device based on a magnitude of electric power of a response signal transmitted from the search target device which has received the search signal.

The search signal is transmitted in the direction in which the directional antenna having the variable direction is directed. Thus, the direction in which the search target device is present can be searched for in accordance with the electric power of the response signal, and electric power can be wirelessly transmitted in the direction found in the search. Accordingly, efficient power transmission is allowed.

(11) Preferably, the search target device includes a capacitor and a signal processing circuit configured to wirelessly transmit, in a case in which electric power of a predetermined amount or more is accumulated in the capacitor, a sensor signal through use of the electric power accumulated in the capacitor, the capacitor is configured to accumulate electric power obtained through reception of a power transmission signal by the power reception circuit, and the search method further includes: transmitting the power transmission signal for transmitting electric power from the directional antenna in the direction found in the search; and determining, in accordance with whether the sensor signal from the search target device is received, whether a configuration other than the power reception circuit of the search target device is normal or abnormal. In a case in which the sensor signal is not received after the power transmission signal is transmitted to the search target device, it is understood that, in the search target device, an operation of wirelessly transmitting the sensor signal through use of the electric power obtained by receiving the power transmission signal is not performed. In this manner, whether the configuration other than the power reception circuit of the search target device is normal or abnormal is determined.

(12) A signal processing device (first signal processing device) according to at least one embodiment of the present invention includes: a signal processing circuit configured to receive an input signal; a first generation circuit configured to generate the input signal; and a second generation circuit configured to generate a pseudo signal of the input signal so as to supply the pseudo signal to the signal processing circuit, and the second generation circuit includes a power reception circuit configured to receive wireless power supply from an outside, and is configured to generate the pseudo signal through use of electric power received by the power reception circuit. In this manner, through reception of the wireless power supply from the outside, the same signal processing as that at the time at which the signal processing circuit receives the input signal can be performed even without receiving the input signal. Accordingly, the test of the signal processing in the signal processing circuit can be performed at a desired timing.

(13) Preferably, the second generation circuit is connected to the signal processing circuit via the first generation circuit, and the pseudo signal is supplied to the signal processing circuit through a path in which the input signal is to be transmitted in the first generation circuit. In this manner, whether or not the first generation circuit is abnormal can be detected.

(14) Preferably, the first generation circuit includes a power generation element including an electrode configured to generate electric power owing to presence of a detection target so as to generate the input signal, and the second generation circuit is connected to the electrode so that the pseudo signal is allowed to be supplied to the signal processing circuit via the electrode. In this manner, whether or not the electrode is abnormal can be detected.

(15) Preferably, the second generation circuit includes: an antenna configured to receive a microwave for the wireless power supply; and a rectifier configured to rectify the microwave so as to generate the pseudo signal. In this manner, the second generation circuit can receive the wireless power supply.

(16) Preferably, the first generation circuit includes a power generation element configured to generate electric power owing to presence of a detection target so as to generate the input signal, and the signal processing circuit is a battery-less circuit configured to operate through use of the input signal as power supply electric power. In this manner, whether or not the first generation circuit is abnormal can be detected regardless of whether or not the detection target is present.

(17) Preferably, the signal processing circuit is configured to be supplied with one of the input signal or the pseudo signal so as to cause a first antenna to wirelessly transmit a first signal. In this manner, the signal processing device can be used as a sensor for detecting the input signal.

(18) Preferably, the signal processing device further includes a second antenna configured to wirelessly transmit a second signal generated based on a radio wave received for the wireless power supply. In this manner, the second signal can be supplied as a response signal with respect to the reception of the radio wave for the wireless power supply.

(19) Preferably, the second signal is a harmonic wave of the radio wave, the harmonic wave being generated in the power reception circuit which has received the radio wave.

In this manner, without mounting a circuit for generating the second signal, the harmonic wave generated through reception of the radio wave for the wireless power supply can be supplied as the second signal.

(20) Preferably, the power reception circuit includes a rectification circuit configured to rectify the radio wave so as to obtain electric power, and the second signal includes a harmonic wave generated during rectification performed by the rectification circuit. In this manner, without mounting a circuit for generating the second signal, the harmonic wave generated through reception and rectification of the radio wave can be supplied as the second signal.

2. Example of Signal Processing Device and Search Method

Figure 2:
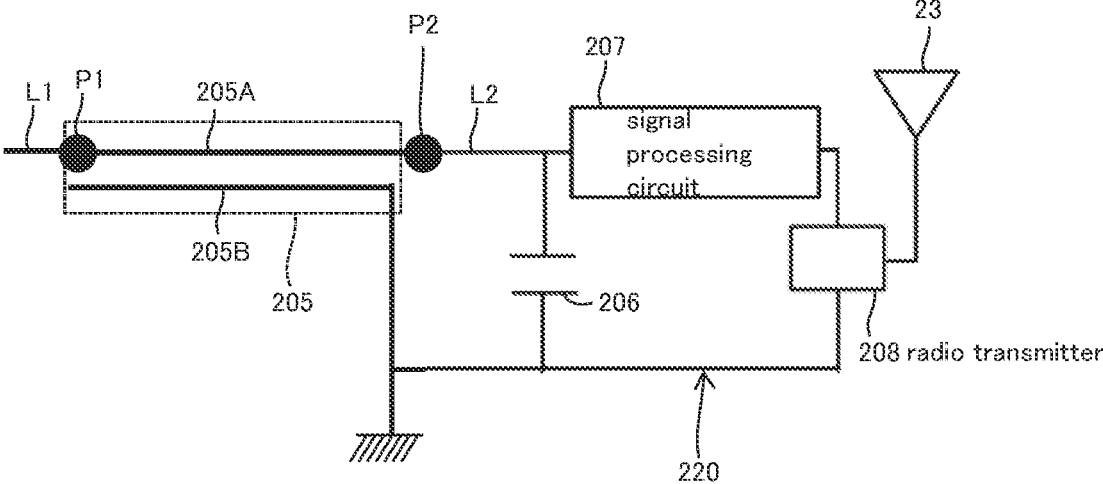
FIG. 2 is a schematic diagram for illustrating a specific example of a configuration of a part of the sensor device.
Figure 3A:
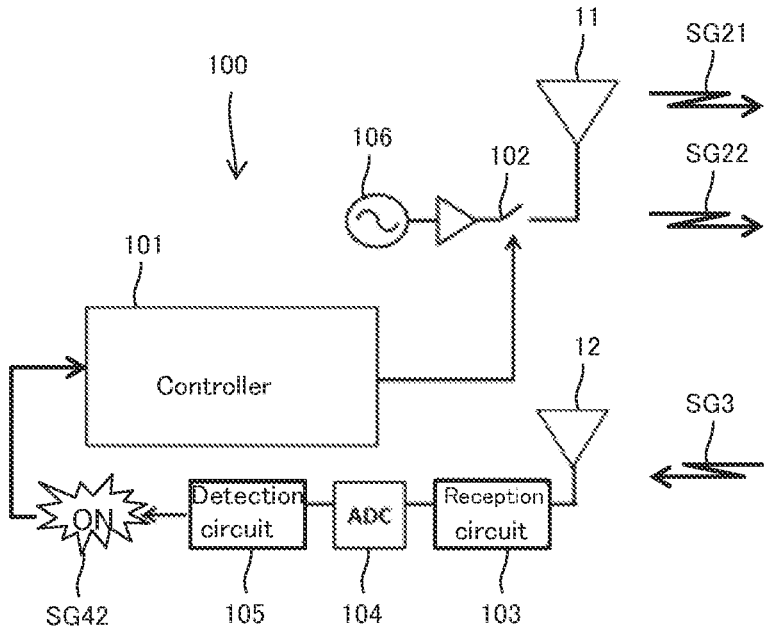
FIG. 3A is a diagram for illustrating a configuration of a power transmission device and FIG. 3B is an outline of a detection signal.

FIG. 1, FIG. 2, and FIG. 3A are diagrams for illustrating an example of a configuration of a sensor system 1 in an embodiment of the present invention. The sensor system 1 includes a sensor device 200 serving as an example of a first signal processing device, and a power transmission device 100 serving as an example of a second signal processing device.

The sensor device 200 senses a sensing target, and supplies a signal indicating sensing results. Preferably, the sensor device 200 performs a sensing operation to generate electric power, and operates through use of this electric power. The power transmission device 100 wirelessly transmits electric power to the sensor device 200. The sensor device 200 operates through use of the electric power supplied from the power transmission device 100. Thus, the sensor device 200 is, preferably, a battery-less circuit.

The power transmission device 100 assumes the sensor device 200 as a search target device, and detects a direction in which the sensor device 200 is present. In this manner, efficient power transmission is allowed.

Preferably, the power transmission device 100 detects an abnormality of the sensor device 200. In this manner, even in a case in which the power transmission device 100 is arranged remote from the sensor device 200 or arranged at a position at which the power transmission device 100 is less likely to recognize the sensor device 200, the power transmission device 100 can detect the abnormality of the sensor device 200 so that the abnormality can be handled.

The sensor device 200 is a device for detecting presence of liquid through use of a water-activated battery. The sensor device 200 is, as an example, a water leakage sensor. The sensor device 200 includes a sensor unit 220. A first antenna 23 is connected to the sensor unit 220. The sensor unit 220 functions as a first transmission unit for supplying a sensor signal (first signal) SG1 from the first antenna 23.

The sensor unit 220 includes a power generation circuit 205. The power generation circuit 205 includes a pair of electrodes 205A and 205B, and functions as a water-activated battery. The sensor unit 220 includes a capacitor 206. The capacitor 206 is connected to the power generation circuit 205. Electric power generated by the power generation circuit 205 is supplied to the capacitor 206 through a conductive wire L2. In this manner, the electric power generated by the power generation circuit 205 is accumulated in the capacitor 206.

The electrodes 205A and 205B function as a positive electrode and a negative electrode, respectively. The electrodes 205A and 205B generate electric power by coming into contact with liquid present between the electrodes. The power generation circuit 205 detects the presence of the liquid between the electrodes 205A and 205B based on the electric power generated by the electrodes 205A and 205B.

The sensor unit 220 includes a signal processing circuit 207. An input signal is received by the signal processing circuit 207, and the signal processing circuit 207 uses the input signal to perform processing of wirelessly transmitting the sensor signal SG1 from the first antenna 23.

The capacitor 206 is connected to a power supply terminal of the signal processing circuit 207. The signal processing circuit 207 operates through use of the capacitor 206 as an operation power supply. The signal processing circuit 207 monitors a charged voltage of the capacitor 206.

A radio transmitter 208 is connected to the signal processing circuit 207. The radio transmitter 208 performs wireless communication to/from a receiver 300. Examples of the wireless communication include Bluetooth (trademark) and Bluetooth Low Energy (trademark).

The signal processing circuit 207 supplies, after detecting that the charged voltage of the capacitor 206 has reached a set voltage Vt, the electric power charged in the capacitor 206 to the radio transmitter 208. The set voltage Vt is a threshold value set in advance as a drive condition of the radio transmitter 208. That is, the signal processing circuit 207 receives a power signal generated by the electric power charged in the capacitor 206 as the input signal. In this manner, the sensor signal SG1 is supplied from the radio transmitter 208.

The electric power of the capacitor 206 is consumed through supply of the electric power to the radio transmitter 208 by the signal processing circuit 207. Thus, a potential of the capacitor 206 is reduced. Accordingly, the operation of the signal processing circuit 207 is stopped. In this manner, the supply of the electric power to the radio transmitter 208 is stopped. In a case in which electric power is generated by the power generation circuit 205, the capacitor 206 is re-charged.

In a case in which electric power is generated by the power generation circuit 205, the capacitor 206 repeats charging and discharging. In other words, the power generation circuit 205 functions as a first generation circuit for generating the input signal to be supplied to the signal processing circuit 207. Along therewith, the output of the sensor signal SG1 from the radio transmitter 208 becomes intermittent output having a time interval H. The sensor signal SG1 supplied from the radio transmitter 208 becomes a detection signal indicating detection of water leakage.

The time interval H of the output of the sensor signal SG1 is dependent on a charge speed to the capacitor 206. The charge speed becomes faster as a power generation amount of the power generation circuit 205 becomes larger. Thus, the time interval H becomes shorter as the power generation amount of the power generation circuit 205 becomes larger, and becomes longer as the power generation amount of the power generation circuit 205 becomes smaller.

As the electrodes 205A and 205B come into contact with the liquid in a larger area, the power generation amount is increased. Thus, for example, the electrodes 205A and 205B are installed at a location for monitoring the water leakage as a position at which the amount of liquid present between the electrodes 205A and 205B is increased as a water level rises. In this manner, the water leakage can be detected based on the time interval H. For example, the time interval H of the output of the sensor signal SG1 is measured, and in a case in which the time interval H becomes shorter than the threshold value set in advance, the water leakage can be detected.

The sensor signal SG1 is received by the receiver 300. The receiver 300 is a device to be held by an observer, and is, for example, a terminal device such as a smartphone. In this manner, the water leakage can be remotely monitored.

The sensor device 200 includes a reception unit 210. A reception antenna 21 is connected to the reception unit 210. The reception antenna 21 receives a radio wave being a microwave. The radio wave is transmitted from the power transmission device 100. The reception unit 210 includes a power reception circuit 211 for receiving wireless power supply from the power transmission device 100. The power reception circuit 211 includes a rectification circuit 212 for rectifying the radio wave received by the reception antenna 21 so as to obtain electric power.

The rectification circuit 212 includes, as an example, a diode 201, a filter 202, and a capacitor 204. The diode 201 rectifies the radio wave supplied from the reception antenna 21 so as to convert the radio wave into DC power. The DC power is supplied to the filter 202. The filter 202 has a function of removing a pulsating current being a harmonic component as a noise, and is, for example, a band elimination filter (BEF), a low pass filter (LPF), or the like. The filter 202 removes a high frequency noise from the DC power supplied from the diode 201. The DC power from which the noise is removed by the filter 202 is once accumulated in the capacitor 204.

The power reception circuit 211 is connected to the sensor unit 220 via the conductive wire L1. In this manner, the electric power obtained by the power reception circuit 211 is supplied to the sensor unit 220 via the conductive wire L1. That is, the radio wave received as electric power by the reception antenna 21 is supplied to the sensor unit 220 as DC power. The electric power supplied via the conductive wire L1 is supplied to the capacitor 206 via a conductive wire L2 in the sensor unit 220. In this manner, the electric power obtained by the rectification circuit 212 is supplied to the signal processing circuit 207.

The signal processing circuit 207 wirelessly transmits the sensor signal SG1 through use of the electric power generated in the power generation circuit 205 so as to cause the sensor device 200 to function as a sensor. The received electric power in the reception unit 210 is also charged in the capacitor 204 so that the signal processing circuit 207 performs processing of wirelessly transmitting the sensor signal SG1 through use of the received electric power as well. In other words, the signal processing circuit 207 does not distinguish the received electric power and the electric power generated in the power generation circuit 205, and performs the processing of wirelessly transmitting the sensor signal SG1 similarly no matter which of the electric powers is supplied. Thus, assuming that the electric power obtained through power generation by the power generation circuit 205 as the input signal, the electric power supplied by the reception unit 210 corresponds to a pseudo signal suspecting the input signal.

The reception unit 210 functions as a second generation circuit configured to generate a pseudo signal of the input signal, and to supply the pseudo signal to the signal processing circuit 207. The reception unit 210 functioning as the second generation circuit includes the power reception circuit 211 for receiving the wireless power supply from the outside, and is configured to generate the pseudo signal through use of the electric power received by the power reception circuit 211.

The power reception circuit 211 is connected with respect to the sensor unit 220 at a position at which the received electric power can be supplied to the capacitor 206 via the conductive wire L2. As an example, the conductive wire L1 from the power reception circuit 211 may be connected on the conductive wire L2 connecting the capacitor 206 and the electrodes 205A and 205B to each other illustrated as a position P2 in FIG. 2.

In this manner, the electric power received by the power reception circuit 211 is supplied to the capacitor 206 via the conductive wire L2. Accordingly, the pseudo signal is supplied to the signal processing circuit 207 through a path similar to that for the input signal. In this manner, through use of the pseudo signal, an operation similar to that performed at the time of supplying the input signal to the signal processing circuit 207 is performed. Thus, whether the sensor device 200 is abnormal or normal can be determined.

Preferably, the conductive wire L1 from the power reception circuit 211 is connected on the electrodes 205A and 205B. More preferably, the conductive wire L1 is connected to an end portion of the electrodes 205A and 205B on a side farther from the capacitor 206 illustrated as a position P1 in FIG. 2. In this manner, the pseudo signal is supplied to the signal processing circuit 207 via the electrodes 205A and 205B. Accordingly, whether the electrodes 205A and 205B are abnormal or normal can also be determined.

The sensor device 200 includes a second antenna 22. The second antenna 22 functions as a second transmission unit. A harmonic wave is generated through a rectification operation performed in the rectification circuit 212. The generated harmonic wave is radiated into air from the second antenna 22 as a response signal SG3 (second signal).

The reception antenna 21 and the second antenna 22 may form, as an example, a dipole antenna. The reception antenna 21 and the second antenna 22 may each be, as another example, a monopole antenna including only one of antenna elements.

The power transmission device 100 includes a phase locked loop (PLL) 106. The PLL 106 generates a signal SG2 having a predetermined frequency from a power supply (not shown), and supplies the signal SG2. The predetermined frequency is, for example, 2.45 GHz.

The power transmission device 100 includes a transmission antenna 11, and the signal SG2 is wirelessly transmitted from the transmission antenna 11 to the sensor device 200. The transmission antenna 11 has a length corresponding to the frequency of the signal SG2.

The transmission antenna 11 is a directional antenna having a variable direction. The power transmission device 100 assumes the sensor device 200 as the search target device and detects the direction in which the sensor device 200 is present. Then, the power transmission device 100 directs the transmission antenna 11 in the direction in which the sensor device 200 is present, and supplies electric power. In this manner, efficient power supply is allowed.

The power transmission device 100 includes a controller 101 serving as a signal processing circuit. The controller 101 is connected to a switch 102 so as to control ON/OFF of the switch 102. The switch 102 is connected to the PLL 106. In this manner, the timing to transmit the signal SG2 from the transmission antenna 11 is controlled by the controller 101.

The power transmission device 100 includes a reception antenna 12 for receiving the response signal SG3. The reception antenna 12 has a length corresponding to the frequency of the response signal SG3. Specifically, the reception antenna 12 has a length resonating with the frequency of the response signal SG3. The response signal SG3 is a harmonic wave having a frequency which is a multiple of a frequency of the signal SG2 serving as a fundamental wave.

Preferably, the harmonic wave is a second harmonic wave having a frequency which is twice as large as the frequency of the signal SG2. The harmonic wave has weaker energy as its frequency is increased. Accordingly, through reception of the second harmonic wave having the maximum energy among the harmonic waves, a harmonic wave having high energy can be used in signal processing to be described later.

In a case in which the frequency of the signal SG2 is 2.45 GHz, the transmission antenna 11 has a length corresponding to 2.45 GHz. In a case in which the response signal SG3 is a second harmonic wave, its frequency is 4.9 GHz. Thus, the reception antenna 12 has a length which corresponds to an electromagnetic wave of 4.9 GHz, and is shorter than that of the transmission antenna 11.

The power transmission device 100 includes a reception circuit 103. The reception circuit 103 functions as a receiver for processing the response signal SG3 received by the reception antenna 12. The received response signal SG3 is converted into a digital signal in an AD converter (ADC) 104 so as to be supplied to a detection circuit 105.

The detection circuit 105 detects a magnitude of the electric power of the received response signal SG3, and supplies a first detection signal SG41 indicating the magnitude of the electric power. The power of the first detection signal SG41 changes in accordance with the magnitude of the electric power of the response signal SG3. That is, the first detection signal SG41 has the maximum power in a case in which the response signal SG3 has the maximum electric power.

Figure 3B:
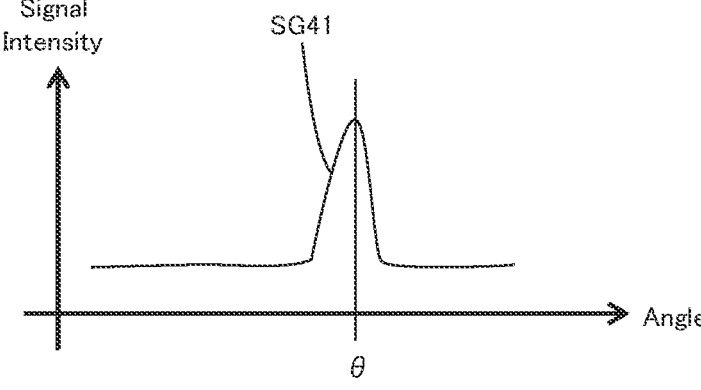

A FIG. 3B is a graph for schematically showing the first detection signal SG41, and is a graph for showing a change in power of the first detection signal SG41 along with an angle change of the reception antenna 12 at the time of receiving the response signal SG3 while changing the angle of the reception antenna 12. In the FIG. 3B, the vertical axis represents signal intensity, and the horizontal axis represents angle. In the example of the FIG. 3B, the first detection signal SG41 has the maximum power in a case in which the angle of the reception antenna 12 is an angle θ. In this manner, it is inferred that the direction at the angle θ in which the reception antenna 12 is directed is the direction in which the sensor device 200 being the search target device is present.

The first detection signal SG41 may be supplied to an output device so as to be used for performing output indicating the magnitude of the electric power of the response signal SG3. As an example, the first detection signal SG41 may be supplied to a display so as to be used as a signal for displaying a graph such as the FIG. 3B. As another example, the first detection signal SG41 may be supplied to a speaker so as to be used for sound output having a frequency corresponding to the magnitude of the electric power of the response signal SG3. In this manner, with the first detection signal SG41, the angle θ at which the reception antenna 12 is directed at the time of the maximum electric power of the response signal SG3, that is, the direction in which the sensor device 200 is present can be known.

The detection circuit 105 may detect the magnitude of the electric power of the received response signal SG3, and supply a second detection signal SG42 indicating a result of comparison with a threshold value set in advance. The second detection signal SG42 is, for example, a signal indicating that the magnitude of the electric power of the response signal SG3 has exceeded the threshold value.

The signal SG2 transmitted from the transmission antenna 11 includes a power transmission signal SG21 and a search signal SG22. The controller 101 has a power transmission mode and a search mode as modes for transmitting the signal SG2 from the transmission antenna 11. The power transmission mode is a mode of transmitting the power transmission signal SG21 from the transmission antenna 11. The search mode is a mode of transmitting the search signal SG22 from the transmission antenna 11.

The power transmission signal SG21 and the search signal SG22 are signals having different power transmission conditions. The power transmission condition is a condition set so that an average transmission power of the search signal SG22 is smaller than an average transmission power of the power transmission signal SG21. As an example, the power transmission signal SG21 and the search signal SG22 have different duty ratios. The search signal SG22 has a duty ratio smaller than that of the power transmission signal SG21.

Figure 4:
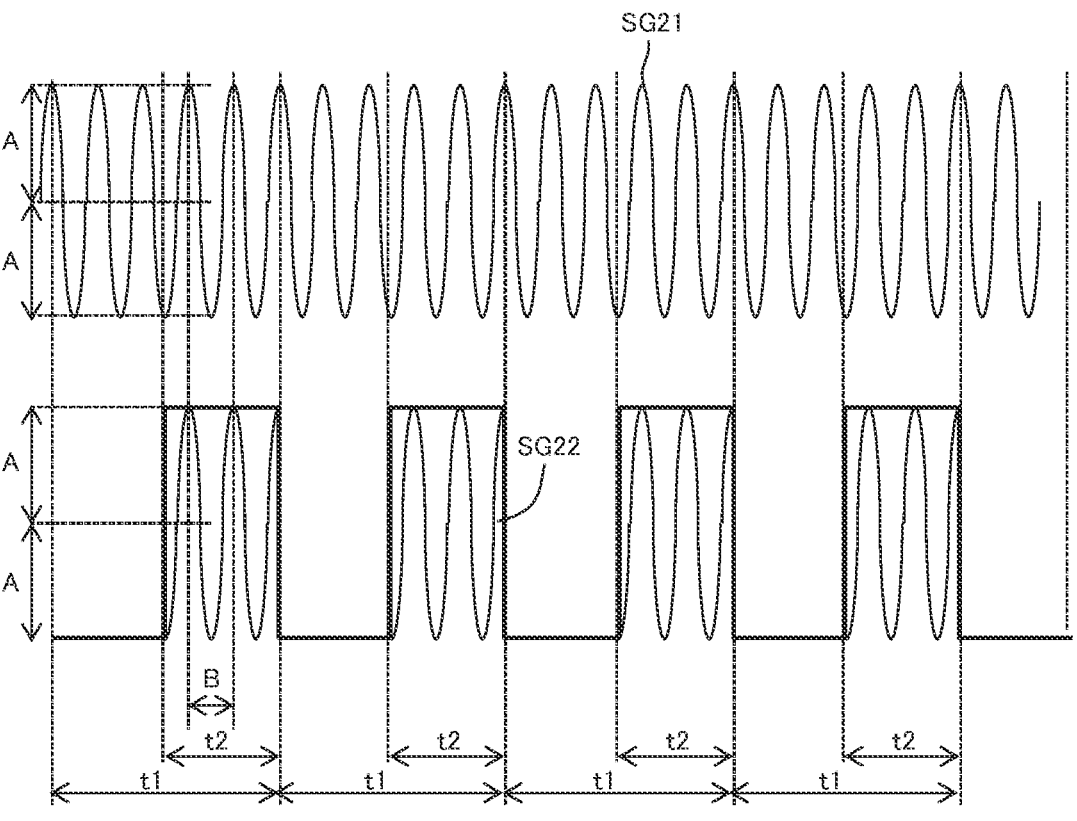
FIG. 4 is a schematic chart for illustrating an example of a power transmission signal and a search signal to be transmitted from the power transmission device.

FIG. 4 is a schematic chart for illustrating an example of the power transmission signal SG21 and the search signal SG22, and is a chart for illustrating a time change of electric power in the power transmission signal SG21 and the search signal SG22. In the example of FIG. 4, both of the power transmission signal SG21 and the search signal SG22 have sine waves, and have equal amplitudes A and periods B. The period B is a time period between peaks of the amplitude. The power transmission signal SG21 is a continuous wave signal, and the sine wave is continuous. The search signal SG22 is a signal in which the sine wave is intermittently transmitted, and is a signal repeating, for each period t1, an ON period t2 in which the sine wave is continuous and an OFF period (t1-t2) being a sine wave stop period. A duty ratio t2/t1 of the search signal SG22 is smaller than a duty ratio 1 of the power transmission signal SG21. In other words, the power transmission signal SG21 is a signal having a duty ratio larger than that of the search signal SG22.

In order to obtain the power transmission signal SG21 and the search signal SG22 having different duty ratios, the controller 101 changes the timing to perform ON/OFF of the switch 102 between the power transmission mode and the search mode. In the case of the example of FIG. 4, in the power transmission mode, the controller 101 maintains the ON state of the switch 102. In this manner, the power transmission signal SG21 being the continuous wave signal is supplied. In the search mode, the controller 101 performs ON/OFF of the switch 102 so that the duty ratio becomes t2/t1. In this manner, the signal search SG22 is intermittently supplied with the duty ratio of t2/t1.

A radio field intensity at the time of transmitting the search signal SG22 is set to be equivalent to a radio field intensity of the power transmission signal SG21. In this manner, through intermittent transmission of the search signal SG22, power consumption during search can be decreased without reducing the radio field intensity of the response signal SG3.

The power transmission condition is, as another example, one or more conditions selected from the group consisting of the magnitude of the electric power, a radio frequency for performing wireless transmission, and the duty ratio. That is, the search signal SG22 may be a signal having electric power smaller than that of the power transmission signal SG21. Further, the search signal SG22 may be a signal having a frequency smaller than that of the power transmission signal SG21. Still further, the power transmission condition may be a combination thereof.

Instead of performing control of switching the power transmission condition by the controller 101 between the power transmission mode and the search mode, the transmission antenna 11 may include an antenna element for transmitting the search signal SG22 and an antenna element for transmitting the power transmission signal SG21, and the controller 101 may switch the antenna element to be used for transmission.

In this manner, the average transmission power of the search signal SG22 can be smaller than the average transmission power of the power transmission signal SG21. As a result, the electrical energy of the search signal SG22 can be decreased to be smaller than the electrical energy of the power transmission signal SG21.

Preferably, the second detection signal SG42 is supplied from the detection circuit 105 to the controller 101. The controller 101 switches, after receiving the input of the second detection signal SG42, the mode from the search mode to the power transmission mode. In this manner, the controller 101 switches the mode to the power transmission mode after the direction in which the sensor device 200 being the search target device is present has been found in the search. As a result, the power transmission signal SG21 can be transmitted under a state in which the transmission antenna 11 is directed in the direction in which the sensor device 200 is present. Accordingly, the power transmission efficiency can be improved.

Figure 5:
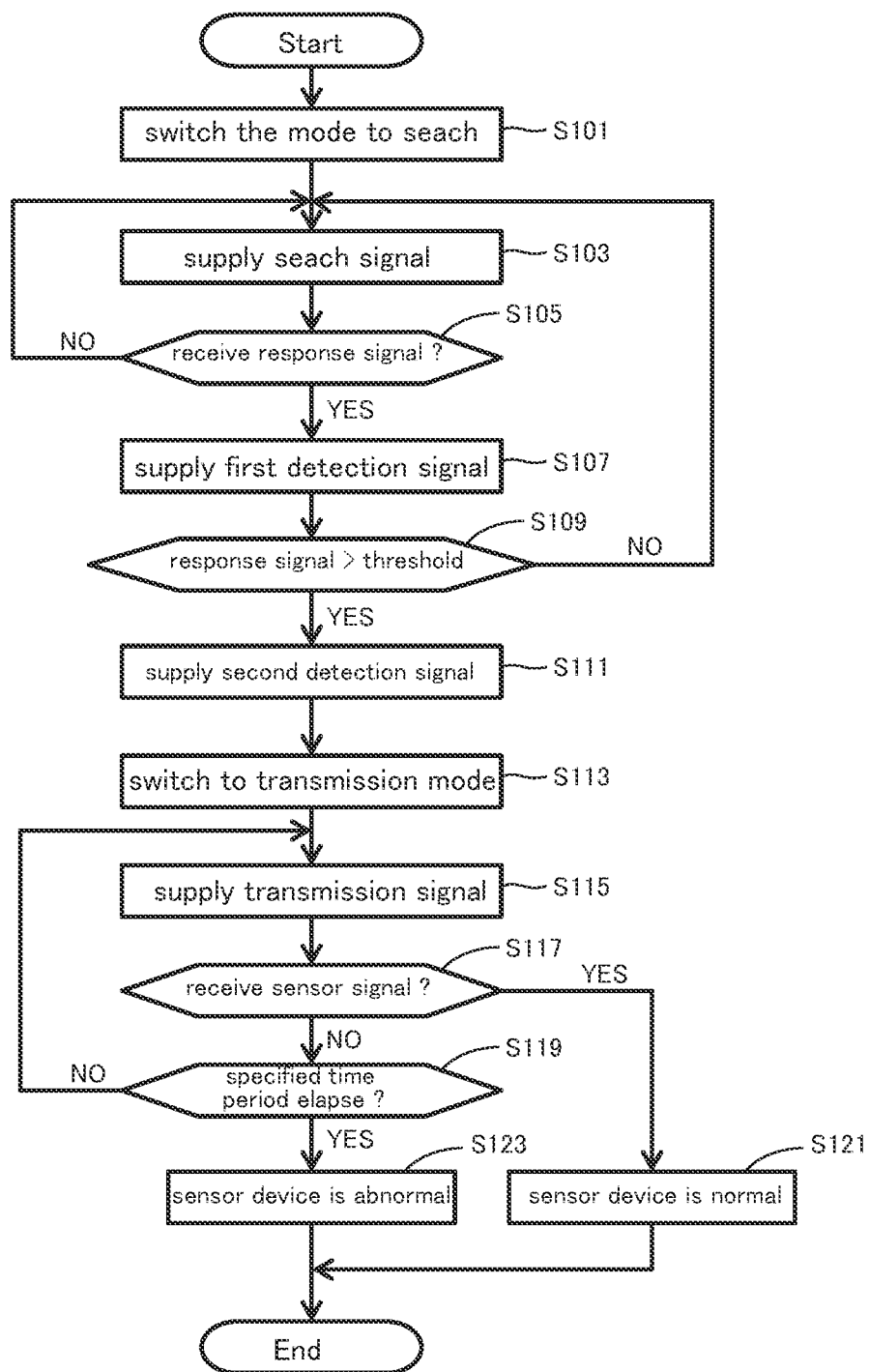
FIG. 5 is a flow chart for illustrating an example of a method of searching for a direction in which a search target device is present and a method of detecting an abnormality of the sensor device.

FIG. 5 is a flow chart for illustrating an example of a method of searching for the direction in which the sensor device 200 being the search target device is present and a method of detecting an abnormality of the sensor device 200, through use of the power transmission device 100. As an example, the search for the sensor device 200 is performed before the power transmission to the sensor device 200 is performed. In this manner, the power transmission signal SG21 can be transmitted under a state in which the transmission antenna 11 being the directional antenna is directed in the direction in which the sensor device 200 is present.

Further, as another example, the search for the sensor device 200 is performed at the time of detecting the abnormality of the sensor device 200. The power transmission device 100 transmits the power transmission signal SG21 from the transmission antenna 11 in the direction in which the sensor device 200 is present which has been found in the search and detects the abnormality of the sensor device 200 through use of the response signal SG3.

Regarding the search, as an example, a user of the power transmission device 100 searches for the direction in which the sensor device 200 is present while changing the direction of the transmission antenna 11 having the variable direction. The user can determine the direction in which the sensor device 200 is present based on detection results obtained from the power transmission device 100.

In place of the user, a processing device may be connected to the power transmission device 100, and a series of search steps may be performed in the processing device. In this case, the transmission antenna 11 is connected to a drive device so that the direction of the transmission antenna 11 can be changed by the drive device following the control of the processing device. Then, the processing device determines the direction in which the sensor device 200 is present based on detection results obtained from the power transmission device 100.

With reference to FIG. 5, first, the controller 101 switches the mode to the search mode (Step S101), and causes the transmission antenna 11 to supply the search signal SG22 (Step S103). At this time, the user or the processing device continuously changes the direction of the transmission antenna 11. As an example, the transmission antenna 11 may be rotated by 360° in a horizontal plane, or the transmission antenna 11 may be rotated by 360° in a vertical plane. In this manner, the search signal SG22 is transmitted in each direction.

In a case in which the reception circuit 103 receives the response signal SG3 ("YES" in Step S105), the detection circuit 105 supplies the first detection signal SG41 indicating the magnitude of the electric power of the received response signal SG3 (Step S107).

The detection circuit 105 compares the magnitude of the electric power of the received response signal SG3 with the threshold value stored in advance. In a case in which the magnitude of the electric power of the received response signal SG3 does not reach the threshold value ("NO" in Step S109), the detection circuit 105 does not supply the second detection signal SG42. In this manner, until the magnitude of the electric power of the response signal SG3 becomes equal to or larger than the threshold value, as shown in FIG. 3B, the first detection signal SG41 indicating the magnitude of the electric power of the response signal SG3 is continuously supplied. The transmission antenna 11 is rotated at this time so that the magnitude of the electric power of the response signal SG3 in each direction can be known based on the first detection signal SG41.

In a case in which the magnitude of the electric power of the received response signal SG3 is equal to or larger than the threshold value ("YES" in Step S109), the detection circuit 105 supplies the second detection signal SG42 indicating the result of the comparison (Step S111). In this manner, it can be known that the direction of the transmission antenna 11 at this time point is the direction in which the sensor device 200 is present.

The second detection signal SG42 is supplied from the detection circuit 105 to the controller 101. In response to input of the second detection signal SG42, the controller 101 switches the mode from the search mode to the power transmission mode (Step S113). With this switching, the controller 101 brings the switch 102 to the OFF state. In this manner, the power transmission signal SG21 is supplied from the transmission antenna 11 (Step S115).

The direction of the transmission antenna 11 at the time of supplying the power transmission signal SG21 in Step S115 is set to the direction in which the magnitude of the electric power of the response signal SG3 is detected to be equal to or larger than the threshold value in Step S109. In this manner, electric power is intensively transmitted in the direction in which the sensor device 200 is present, and thus the power transmission efficiency can be improved.

In the above-mentioned search, the response signal SG3 is used instead of using the sensor signal SG1 from the sensor device 200 so that the search can be performed faster as compared to a case in which the sensor signal SG1 is used. The search can be performed faster because, in order to supply the sensor signal SG1, it is required to wait until the charging of the capacitor 206 reaches the set voltage Vt. Accordingly, the magnitude of the electric power of the response signal SG3 can be detected while continuously rotating the transmission antenna 11.

Preferably, whether the sensor device 200 is abnormal is detected after the direction in which the sensor device 200 is present has been found in the search. Specifically, in a case in which the sensor signal SG1 is received by the receiver 300 within a specified time period after the power transmission signal SG21 is supplied in Step S115 ("YES" in Step S117), it is determined that the sensor device 200 is normal (Step S121). The reason therefor is because it is understood that, through power supply from the power transmission device 100, the sensor device 200 operates similarly to the case in which the electric power generated in the power generation circuit 205 is used, and thus the sensor signal SG1 is supplied.

In a case in which the sensor signal SG1 is not received by the receiver 300 even after the above-mentioned specified time period elapses ("NO" in Step S117 and "YES" in Step S119), it is determined that a configuration other than the reception unit 210 of the sensor device 200 has an abnormality (Step S123). The reason therefor is because, although electric power is received in the reception unit 210 of the sensor device 200, the sensor signal SG1 is not supplied through use of the received electric power. In this manner, the abnormality of the configuration other than the reception unit 210 of the sensor device 200 can be determined.

The inventors have performed an experiment for verifying the search method according to the embodiment. In the experiment, as the antennas 11 and 12 of the power transmission device 100, a composite Yagi-Uda antenna formed of the transmission antenna 11 having a length corresponding to 2.45 GHz and the reception antenna 12 having a length corresponding to 4.9 GHz was used. The antennas 11 and 12 each include eight directors, and have boom lengths of 30 cm and 15 cm, respectively. The maximum antenna gain of the transmission antenna 11 is 15.74 dBi, and the maximum antenna gain of the reception antenna 12 is 12.74 dBi.

As another example of the antennas 11 and 12 of the power transmission device 100, one antenna obtained by connecting an antenna element having a length corresponding to 2.45 GHz and an antenna element having a length corresponding to 4.9 GHz in series to each other may be used. The reason therefor is because the direction in which the power transmission signal SG21 is transmitted matches the direction in which the response signal SG3 is received. In this manner, the antenna area can be reduced, and the mutual influence between the antennas 11 and 12 can be suppressed.

As the antennas 21 and 22 of the sensor device 200, the reception antenna 21 being a sleeve antenna having a length corresponding to 2.45 GHz and the second antenna 22 being a dipole antenna having a length corresponding to 4.9 GHz were used. The boom length of the reception antenna 21 is 3 cm, and the boom length of the second antenna 22 is 6 cm. The maximum antenna gain of the reception antenna 21 is 2.14 dBi, and the maximum antenna gain of the second antenna 22 is 2.04 dBi.

Figure 6:
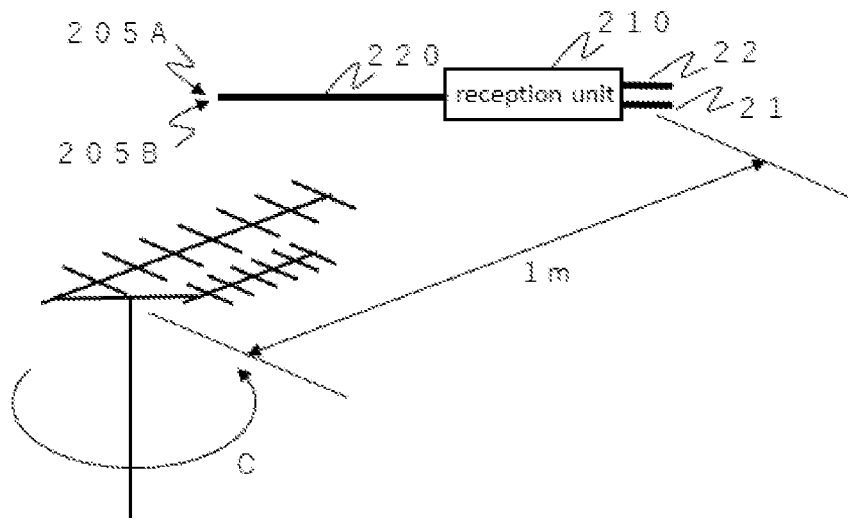
FIG. 6 is a diagram for illustrating a configuration of the sensor device used in an experiment performed by the inventors and how to operate the power transmission device at the time of the search.

FIG. 6 is a diagram for illustrating the configuration of the sensor device 200 used in the experiment and how to operate the power transmission device 100 at the time of the search. In the sensor device 200, the reception unit 210 is connected to one end of the electrodes 205A and 205B, and the antennas 21 and 22 are arranged. The power transmission device 100 was located at a position separated away from the sensor device 200 by 1 m.

At the position separated away from the sensor device 200 by 1 m, as shown by the arrow C of FIG. 6, the power transmission device 100 was rotated by 360° in a horizontal plane, and the reception level of the response signal SG3 from the sensor device 200 at each position was measured. Regarding the rotation, the rotation of 360° was performed in four seconds. In the search mode, the period t1 was set to 552 ms, and the duty ratio t2/t1 was set to 0.087. Under this state, the search signal SG22 was intermittently transmitted.

Figure 7:
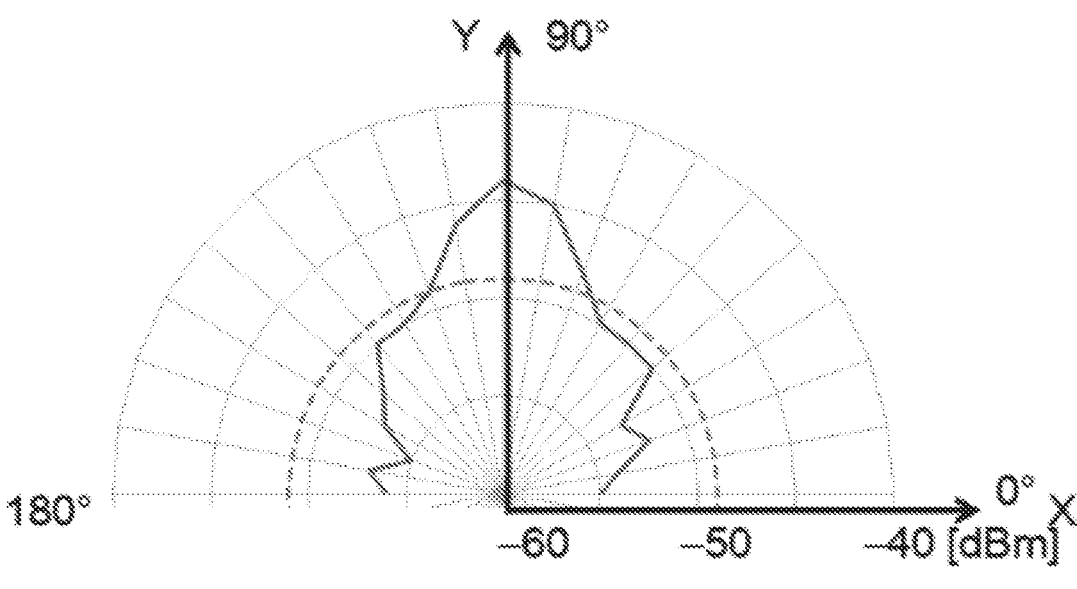
FIG. 7 is a graph for showing measurement results of a reception level of a response signal in the power transmission device.

FIG. 7 is a graph for showing measurement results of the reception level of the response signal SG3 from the sensor device 200 in the power transmission device 100. An angle around the origin of FIG. 7 represents the rotation angle of the power transmission device 100, and values of the X axis and the Y axis represent reception levels.

It was understood from the measurement results of FIG. 7 that, with the antennas of the power transmission device 100 and the sensor device 200 used in the experiment, in a case in which the detection level required for position detection was set to 4.9 dBm, the direction in which the sensor device 200 was present was able to be detected within a range of $\pm 20°$ with respect to the angle 90° at which the maximum gain was able to be obtained. The search signal SG22 was transmitted with the duty ratio t2/t1 of 0.087. Accordingly, it was understood that the direction in which the sensor device 200 was present was able to be detected with the electric power being reduced to 1/10 as compared to the power transmission signal SG21 to be transmitted as a continuous signal. Further, it was understood that the direction in which the sensor device 200 was present was able to be detected even at the rotation speed at which the rotation of 360° was performed in four seconds.

Further, the inventors used the above-mentioned power transmission device 100 and sensor device 200 so as to measure the time interval H of the output of the sensor signal SG1 supplied from the sensor device 200 in response to transmission of the power transmission signal SG21 from the power transmission device 100, while changing the position of the power transmission device 100 with respect to the sensor device 200.

Figure 8:
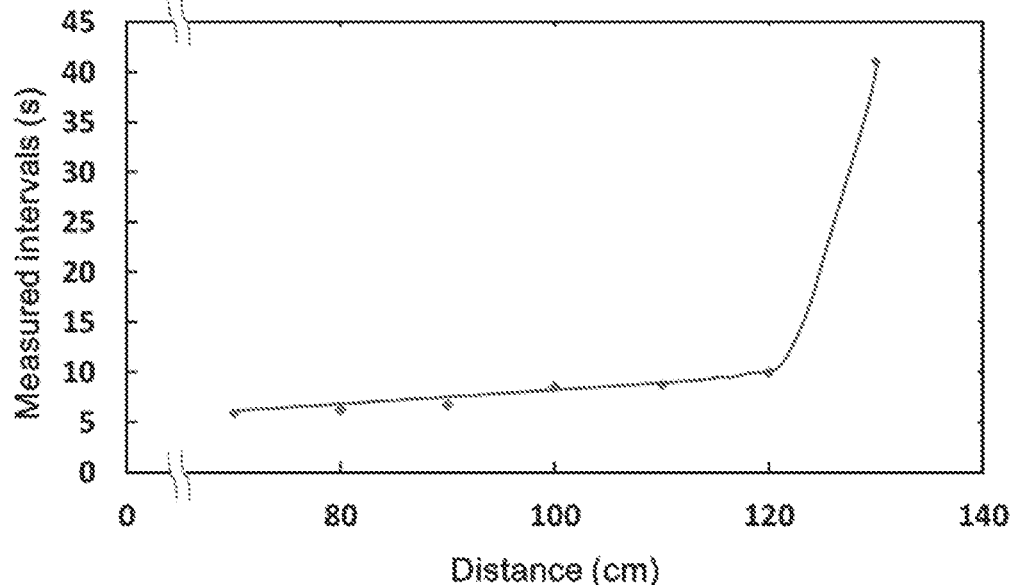
FIG. 8 is a graph for showing measurement results of a time interval of output of a sensor signal.

FIG. 8 is a graph for showing measurement results of the time interval H of the output of the sensor signal SG1. In FIG. 8, the vertical axis represents the time interval H, and the horizontal axis represents the distance of the power transmission device 100 with respect to the sensor device 200. From the measurement results of FIG. 8, the time interval H is ten seconds or less in a case in which the distance of the power transmission device 100 with respect to the sensor device 200 is 120 cm or less, and the time interval H is abruptly increased in a case in which the distance exceeds 120 cm.

From those results, it was understood that the abnormality of the sensor device 200 was able to be detected in the power transmission device 100 in a case in which the distance of the power transmission device 100 with respect to the sensor device 200 was 120 cm or less. Thus, it was understood that, even with the battery-less sensor device 200 having no power supply for abnormality detection mounted thereon, abnormality monitoring was able to be performed through use of the power transmission device 100.

3. Note

The present invention is not limited to the embodiment described above, and various modifications can be made.

What is claimed is:

1. A signal processing device, comprising:
a capacitor;
a first transmission unit configured to wirelessly transmit, in a case in which electric power of a predetermined amount or more is accumulated in the capacitor, a first signal through use of the electric power accumulated in the capacitor;

a power generation circuit configured to generate electric power owing to presence of a detection target, wherein the electric power generated by the power generation circuit is accumulated in the capacitor, the detection target comprises a liquid;

a reception unit configured to receive a radio wave transmitted from an external device; and a second transmission unit configured to wirelessly transmit, in response to reception of the radio wave, a second signal generated based on the received radio wave without using the electric power accumulated in the capacitor.

2. The signal processing device according to claim 1, wherein the second signal is a harmonic wave of the radio wave, the harmonic wave being generated in the reception unit which has received the radio wave.

3. The signal processing device according to claim 2, wherein the reception unit includes a rectification circuit configured to rectify the radio wave so as to obtain electric power, and wherein the second signal includes a harmonic wave generated during rectification performed by the rectification circuit.

4. The signal processing device according to claim 1, wherein the reception unit includes a rectification circuit configured to rectify the radio wave so as to obtain electric power, and wherein the electric power obtained by the rectification circuit is accumulated in the capacitor.

5. The signal processing device according to claim 4, further comprising a power generation circuit, wherein the rectification circuit is connected to the capacitor via the power generation circuit, and wherein the electric power obtained by the rectification circuit is supplied to the capacitor through a path in which electric power generated by the power generation circuit is to be transmitted.

6. The signal processing device according to claim 5, wherein the power generation circuit includes an electrode, and wherein the rectification circuit is connected to the electrode so that the electric power obtained by the rectification circuit is allowed to be supplied to the capacitor via the electrode.

7. The signal processing device according to claim 1, wherein the first transmission unit includes a signal processing circuit, and wherein the signal processing circuit is a battery-less circuit configured to operate through use of the electric power generated by the power generation circuit as power supply electric power.

* * * * *